US008961120B2

(12) United States Patent
Leconte et al.

(10) Patent No.: US 8,961,120 B2
(45) Date of Patent: Feb. 24, 2015

(54) SYSTEM AND METHOD OF EXPANDING A FLUID IN A HERMETICALLY-SEALED CASING

(75) Inventors: Patrice Leconte, Sainte Addresse (FR); Jean-Pierre G. Mullier, Octeville Sur Mer (FR); Herve Dourlens, Goderville (FR)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/203,804

(22) PCT Filed: Sep. 14, 2010

(86) PCT No.: PCT/US2010/048831
§ 371 (c)(1),
(2), (4) Date: Sep. 29, 2011

(87) PCT Pub. No.: WO2012/036678
PCT Pub. Date: Mar. 22, 2012

(65) Prior Publication Data
US 2013/0160455 A1 Jun. 27, 2013

(51) Int. Cl.
*F04D 29/44* (2006.01)
*F02C 7/00* (2006.01)
*F01D 1/02* (2006.01)
*F01K 25/10* (2006.01)

(52) U.S. Cl.
CPC ... *F02C 7/00* (2013.01); *F01D 1/02* (2013.01); *F01K 25/106* (2013.01); *F05D 2220/31* (2013.01); *F05D 2240/20* (2013.01); *Y02E 10/28* (2013.01)
USPC ...................................... 415/199.2

(58) Field of Classification Search
USPC ............. 415/199.2, 198.1, 199.1, 60, 62, 66; 416/124, 128, 199, 198 R, 198 A
See application file for complete search history.

(56) References Cited

U.S. PATENT DOCUMENTS

| 1,684,082 | A * | 9/1928 | Allen | 415/66 |
| 4,715,778 | A * | 12/1987 | Katayama et al. | 415/104 |
| 5,078,571 | A * | 1/1992 | Meylan | 415/66 |
| 5,842,345 | A * | 12/1998 | Scharpf | 60/649 |
| 7,638,892 | B2 * | 12/2009 | Myers | 290/52 |
| 2006/0127216 | A1 * | 6/2006 | Suga et al. | 415/198.1 |
| 2006/0185366 | A1 * | 8/2006 | Kahlbau et al. | 60/645 |
| 2006/0196187 | A1 | 9/2006 | Zimron et al. | |
| 2007/0104572 | A1 * | 5/2007 | Burdgick | 415/198.1 |
| 2008/0250789 | A1 * | 10/2008 | Myers et al. | 60/645 |
| 2008/0252077 | A1 * | 10/2008 | Myers | 290/52 |
| 2008/0252078 | A1 * | 10/2008 | Myers et al. | 290/52 |

FOREIGN PATENT DOCUMENTS

JP     10-030408 A     2/1998

OTHER PUBLICATIONS

PCT/US2010/048831 Notification of Transmittal of the International Search Report and the Written Opinion of the International Searching Authority, or the Declaration dated Jun. 15, 2011.

* cited by examiner

*Primary Examiner* — Edward Look
*Assistant Examiner* — Aaron R Eastman
(74) *Attorney, Agent, or Firm* — Edmonds & Nolte, PC

(57) ABSTRACT

An expander-generator is disclosed. The expander-generator is disposed within a hermetically-sealed housing and includes a high-pressure expander stage and a low-pressure expander stage. A working fluid, such as ammonia, is introduced into the high and low pressure expander stages and expanded therein so as to provide rotational torque to a shaft. A generator, such as a motor, pump, or compressor, may be coupled to a free end of the shaft such that rotation of the shaft will provide useful work for the generator.

16 Claims, 3 Drawing Sheets

SYSTEM AND METHOD OF EXPANDING A FLUID IN A HERMETICALLY-SEALED CASING

CROSS-REFERENCE TO RELATED APPLICATIONS

The present application is an national stage application of PCT Pat. App. No. PCT/US2010/048831, filed Sep. 14, 2010, which claims priority to French App. No. 1003664, filed Sep. 14, 2010. These priority applications are hereby incorporated by reference in their entirety into the present application to the extend that they are not inconsistent with the present application.

BACKGROUND

In the field of synthetic ammonia production, working fluids, such as ammonia, are often brought to high temperatures and pressures during the production process. instead of wasting the potential energy exhibited by such working fluids at these elevated pressures, it is clearly beneficial to capture that energy and generate power therefrom. As can be appreciated, generating power onsite will serve to offset energy costs that would otherwise be expended on power derived from the power grid.

While various power generating devices are known, there is always a need for improved power generating devices for use in a range of chemical production processes.

SUMMARY

Embodiments of the disclosure may provide an expander-generator. The expander-generator may include a hermetically-sealed housing having a shaft disposed therein, the shaft having a free end and extending from a first end of the housing to a second end of the housing. The expander-generator may further include a high pressure expander section disposed about the shaft and configured to receive and expand a working fluid and discharge the working fluid via a high pressure discharge defined within the housing, and a low pressure expander section axially-offset from the high pressure expander section and in fluid communication with the high pressure expander section via the high pressure discharge, wherein the low pressure expander is configured to receive and further expand the working fluid derived from the high pressure discharge. The expander generator may also include a generator coupled to the free end of the shaft, wherein the working fluid is expanded to rotate the shaft and thereby generate useful work for the generator.

Embodiments of the disclosure may further provide a method of expanding a fluid. The method may include introducing a working fluid into a high pressure expander section disposed within a hermetically-sealed housing, the housing having a shaft disposed therein, and expanding the working fluid in the high pressure expander section and thereby providing torque rotation to the shaft. The method may further include discharging the working fluid from the high pressure expander section and introducing the working fluid into a low pressure expander section axially-offset from the high pressure expander section, and expanding the working fluid in the low pressure expander section thereby providing further torque rotation to the shaft, wherein rotation of the shaft generates useful work for a generator coupled to a free end of the shaft.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
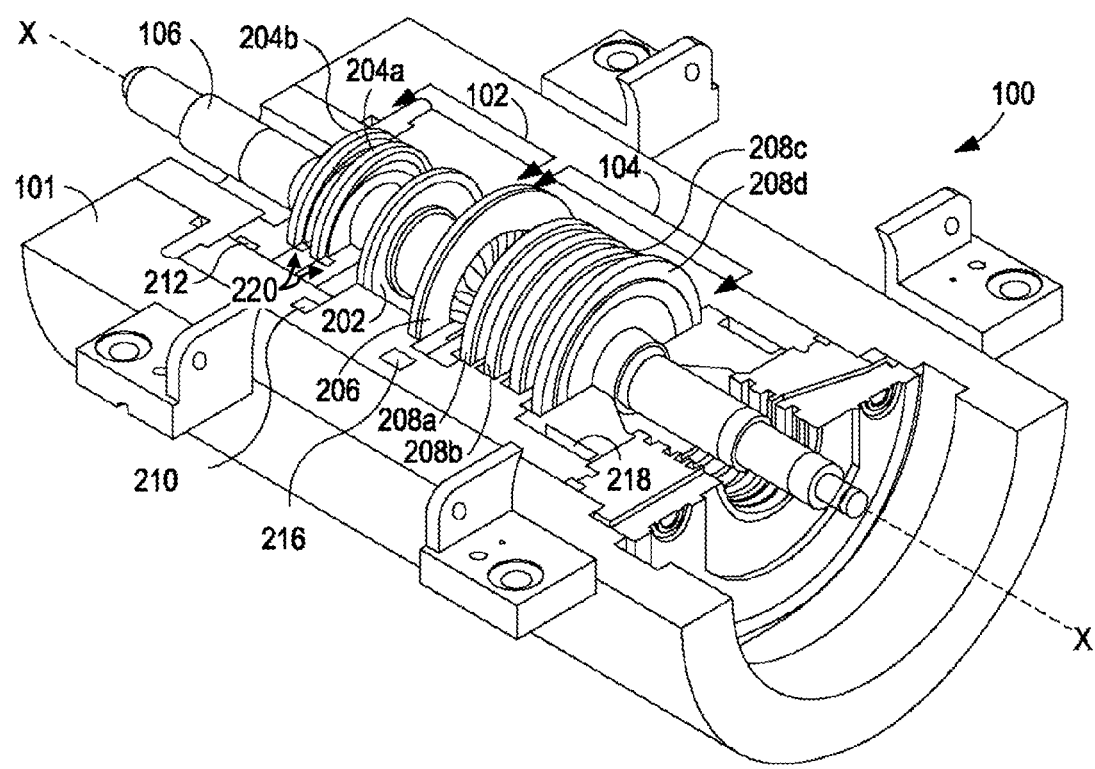
FIG. 1 illustrates an isometric view of an exemplary expander-generator, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
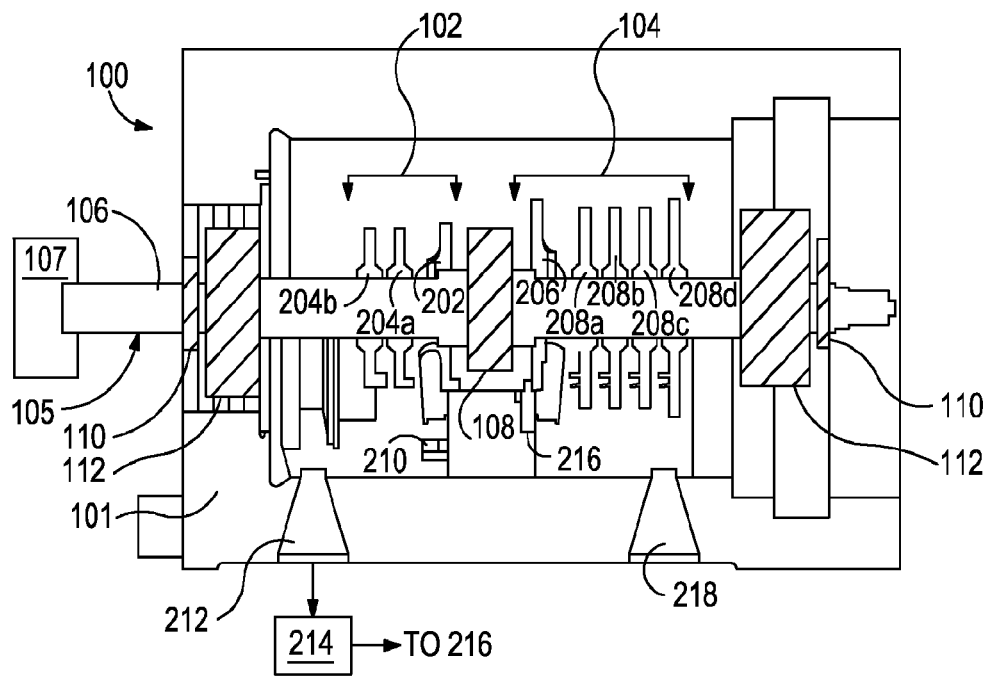
FIG. 2 illustrates a side cross-sectional view of the exemplary expander-generator of FIG. 1.

FIGS. 1 and 2 illustrate an exemplary expander-generator 100, according to one or more embodiments of the disclosure. FIG. 1 provides an isometric view of the expander-generator 100, and FIG. 2 illustrates a corresponding side, cross-sectional view thereof. As depicted, the expander-generator 100 may include a high pressure expander section 102 and a low pressure expander section 104, each being disposed within a hermetically-sealed casing or housing 101. While only the lower half of the housing 101 is shown in FIG. 1, it will be appreciated that the housing 101 also includes an upper half (not shown), and together the upper and lower halves of the housing 101 hermetically-seal the contents disposed therein so that a process gas or working fluid is substantially contained therein.

As illustrated, the expander sections 102, 104 are arranged in a back-to-back configuration. In other embodiments, however, the expander sections 102, 104 may be arranged successively (one after another along a shaft axis) without departing from the scope of the disclosure. Each expander section 102, 104 is coupled to a rotatable shaft 106 that extends substantially the whole length of the housing 101 and rotates about a central axis X. The shaft 106 has a free end 105 to which a generator 107 or the like may be coupled in order to convert any rotational motion of the shaft 106 into useful work, as will be described below.

Referring to FIG. 2, a balance piston 108 may be arranged on the shaft 106 and interposed between the high pressure expander section 102 and the low pressure expander section 104. Embodiments employing a back-to-back configuration are able to employ a balance piston 108 of reduced size since the balance piston 108 will not be required to counteract as much axial thrust commonly found in successively arranged expansion sections.

The shaft 106 is supported at least at each end with one or more radial bearings 110. Each radial bearing 110 may be directly or indirectly supported by the housing 101, and in turn provide support to the shaft 106. In one embodiment, the bearings 110 are magnetic bearings, such as active or passive magnetic bearings. In other embodiments, however, other types of bearings 110 may be used, such as, but not limited to, roller bearings, ball bearings, needle bearings, squeeze-film bearings, combinations thereof, or the like. In addition, at least one axial thrust bearing (not shown) may also be arranged about the shaft 106 and in combination with the radial bearing 110 disposed at the free end 105 of the shaft 106. The axial thrust bearing could also be of the magnetic-type and be configured to at least partially bear axial thrusts generated by the expander sections 102, 104. In other embodiments, any number of bearings may be positioned along the shaft 106 to support the expander components (individually or in groups) in a center hung-type configuration.

The expander-generator 100 may also include one or more shaft seals 112 or seal assemblies disposed about the shaft 106 at or near each end of the shaft 106, and located inboard of the radial bearings 110. In at least one embodiment, each seal 112 includes a tandem dry gas seal having an intermediate labyrinth seal disposed between each dry gas seal. Exemplary dry gas seals can be found in co-owned U.S. Pat. Nos. 6,131,913; 6,267,382; 6,347,800; 6,601,854; 6,916,022, the contents of which are each hereby incorporated by reference to the extent consistent with the present disclosure. In other embodiments, the seals 112 may be buffer seals, such as brush seals, carbon rings, or oil damper seals.

The housing 101 provides both support and protection for the expander sections 102, 104, shaft 106, balance piston 108, bearings 110, and seals 112. Consequently, each of these components shares the same pressure-containing casing. In one embodiment, the components housed within the housing 101 may be configured as a modular bundle assembly or cartridge generally used in the DATUM® product line of compressors commercially-available from Dresser-Rand Company, Olean, NY, USA. The cartridge in the present disclosure may further include the diaphragms and other stationary flow path components, bearings, seals, and instrumentation required to operate the expander-generator 100. At least one advantage to this configuration is that the cartridge can be completely pre-assembled outside of the housing 101, and subsequently installed into the housing 101 as a complete assembly and sealed therein. Moreover, the cartridge can be removed from the housing 101 in the same way, thereby dramatically reducing turnaround times for maintenance operations.

The high and low pressure expander sections 102, 104 may each include at least one radial expander wheel followed by a series of axial expansion stages. For example, in the illustrated embodiment the high pressure expander section 102 includes a high pressure radial expander 202 followed by, or otherwise axially-offset from, two axial expansion stages 204a and 204b. Likewise, the low pressure expander section 104 may include a low pressure radial expander 206 followed by, or otherwise axially-offset from, four axial expansion stages 208a, 208b, 208c, and 208d. As will be appreciated, the number of axial expansion stages 204a,b, 208a-d may be varied to accommodate varying applications of the expander-generator 100. For example, the number of axial expansion stages 204a,b, 208a-d may be increased or decreased to accommodate varying working fluid characteristics and/or conditions, without departing from the scope of the disclosure.

In operation, a working fluid at an elevated pressure and temperature is introduced into the expander-generator 100 via a high-pressure scroll or inlet 210 defined within the housing 101. In one embodiment, the working fluid may be ammonia gas ($NH_3$) derived from a synthetic ammonia production process. In other embodiments, however, the working fluid may include any compressible fluid such as, but in nowise limited to, air, $CO_2$, $N_2$, $H_2S$, natural gas, methane, ethane, propane, $i-C_4$, $n-C_4$, $i-C_5$, $n-C_5$, and/or combinations thereof.

The high pressure inlet 210 may be designed to accelerate and swirl the working fluid before it enters the high pressure radial expander 202. Imparting swirl to the working fluid may allow the design of the nozzle vanes 302 (FIG. 3) of the high pressure radial expander 202 to include a minimal degree of turning, thereby generating minimal losses while the working fluid expands within the body of the high pressure radial expander 202.

Figure 3:
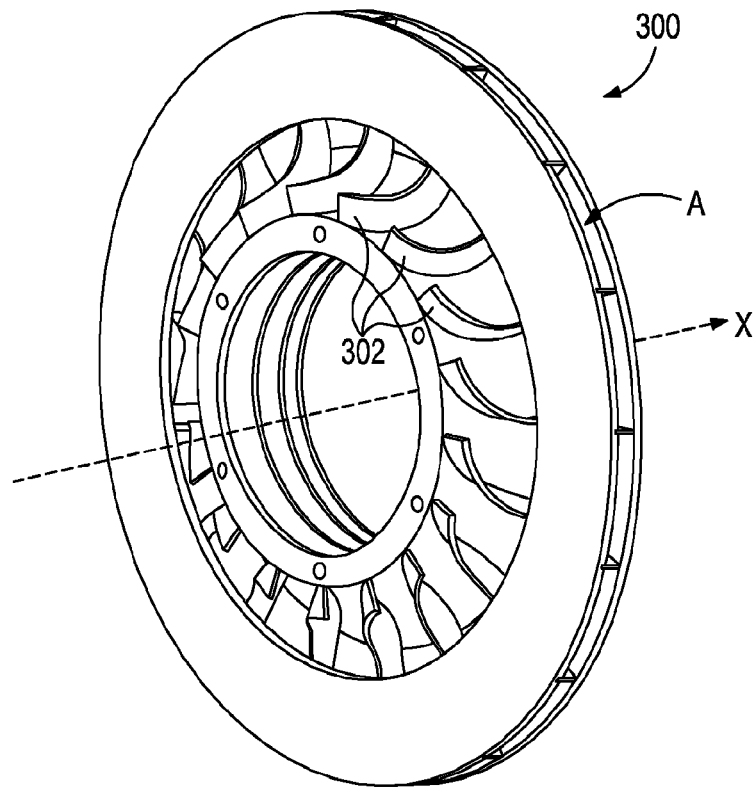
FIG. 3 illustrates an exemplary radial expander wheel, according to one or more embodiments disclosed.

Referring briefly to FIG. 3, illustrated is an exemplary radial expander wheel 300, such as, for example, either the high or low pressure radial expanders 202, 206 as shown in FIGS. 1 and 2. The radial expander wheel 300 is designed to have the working fluid enter radially, as shown by arrow A, and then redirect the flow using the flow using the nozzle vanes 302 and exit therefrom in a predominantly axial direction, corresponding to the central axis X of the shaft 106. As the working fluid passes through the radial expander wheel 300 it expands, thereby causing the shaft 106 to rotate and produce work.

With reference again to FIGS. 1 and 2, after passing through the high pressure radial expander 202, the working fluid is directed into the axial expansion stages 204a,b of the high pressure expander section 102 where it further expands and provides additional rotation force to the shaft 106. Each expansion stage 204a,b may include a stationary set of stator vanes are 220 axially-spaced from a corresponding set of rotating rotor blades. The stator vanes 220 may be mounted to or otherwise disposed within the housing 101, and the rotor blades are circular moving blade sets, symmetrically-mounted radially about the shaft 106.

In at least one embodiment, the stator vanes 220 and rotor blades are complimentarily profiled so that the working fluid expands tangentially with respect to the rotor blades as it moves through each stage 204*a,b*. Accordingly, both the static and rotating airfoils may be designed for maximum aerodynamic performance. As can be appreciated, such smooth fluid flow serve to minimize the acoustic signature of the expander-generator 100 and thereby increase its efficiency. Exemplary profiling of the stator vanes 220 and rotor blades is disclosed in co-owned and co-pending U.S. Pat. application Ser. No. 12/472,590, entitled "System and Method to Reduce Acoustic Signature Using Profiled Stage Design," the contents of which are hereby incorporated by reference to the extent consistent with the present disclosure.

The working fluid exits the high pressure expander section 102 via a high pressure discharge 212 fluidly coupled to the last expansion stage 204*b*. The working fluid generally exits at a lowered temperature and pressure as compared to the temperature and pressure at the high pressure inlet 210. In one embodiment, the high pressure discharge 212 feeds the working fluid to a heat exchanger 214 (FIG. 2) fluidly coupled thereto. The heat exchanger 214 may be adapted to increase the temperature of the working fluid before injecting it into the low pressure expander section 104 via a low pressure scroll or inlet 216 defined within the housing 101. Moreover, the heat exchanger 214 may be configured to remove condensed liquids (if any) resulting from the cooling and depressurization of the working fluid in the high pressure expander section 102. In other embodiments, however, the heat exchanger 214 may be omitted and the high pressure discharge 212 may instead be fluidly coupled directly to the low pressure inlet 216.

The low pressure inlet 216 is in fluid communication with the low pressure radial expander 206 and thereby feeds the working fluid derived from the high pressure expander section 102 to the low pressure radial expander 206. The general design of the low pressure radial expander 206 may be substantially similar to the radial expander wheel 300 described above with reference to FIG. 3, and therefore will not be described again. Furthermore, the axial expansion stages 208*a-d* axially-spaced from and directly following the low pressure radial expander 206 may be substantially similar to the axial expansion stages 204*a,b*, as generally described above, and therefore will also not be described in detail, and instead reference should be made to the disclosure above. As will be appreciated by those skilled in the art, however, to accommodate the lower pressures of the working fluid derived from the high pressure discharge 212, the general dimensions and sizing of the low pressure radial expander 206 and accompanying axial expansion stages 208*a-d* may be larger than the high pressure radial expander 202 and accompanying axial expansion stages 204*a,b*.

As the working fluid courses through the low pressure radial expander 206 and accompanying subsequent axial expansion stages 208*a-d* generally along the central axis X, the working fluid expands even further and thereby provides added torque to the shaft 106 which produces additional work. The spent working fluid is then discharged from the housing via the low pressure discharge 218 which is in fluid communication with the last axial stage 208*d*.

In order to generate power, the free end 105 of the shaft 106 may be coupled to a generator 107 (FIG. 2) or the like. In at least one embodiment, the generator 107 may be an asynchronous electricity generator capable of providing electricity to surrounding applications or even inputting power back into the national power grid. In other embodiments, the generator 107 may be replaced with a compressor or a pump to provide useful work thereto.

Having the high and low pressure sections 102, 104 in a back-to-back configuration, as generally depicted in FIGS. 1 and 2, may serve to minimize the overall thrust forces sustained by the shaft 106. Consequently, a reduced-size balance piston 108 may be employed, thereby allowing the shaft 106 to be shorter which will reduce the overall weight of the shaft 106. As can be appreciated, a lighter shaft 106 rotates more freely with less rotordynamic anomalies, and thereby provides a more efficient expander-generator 100.

Figure 4:
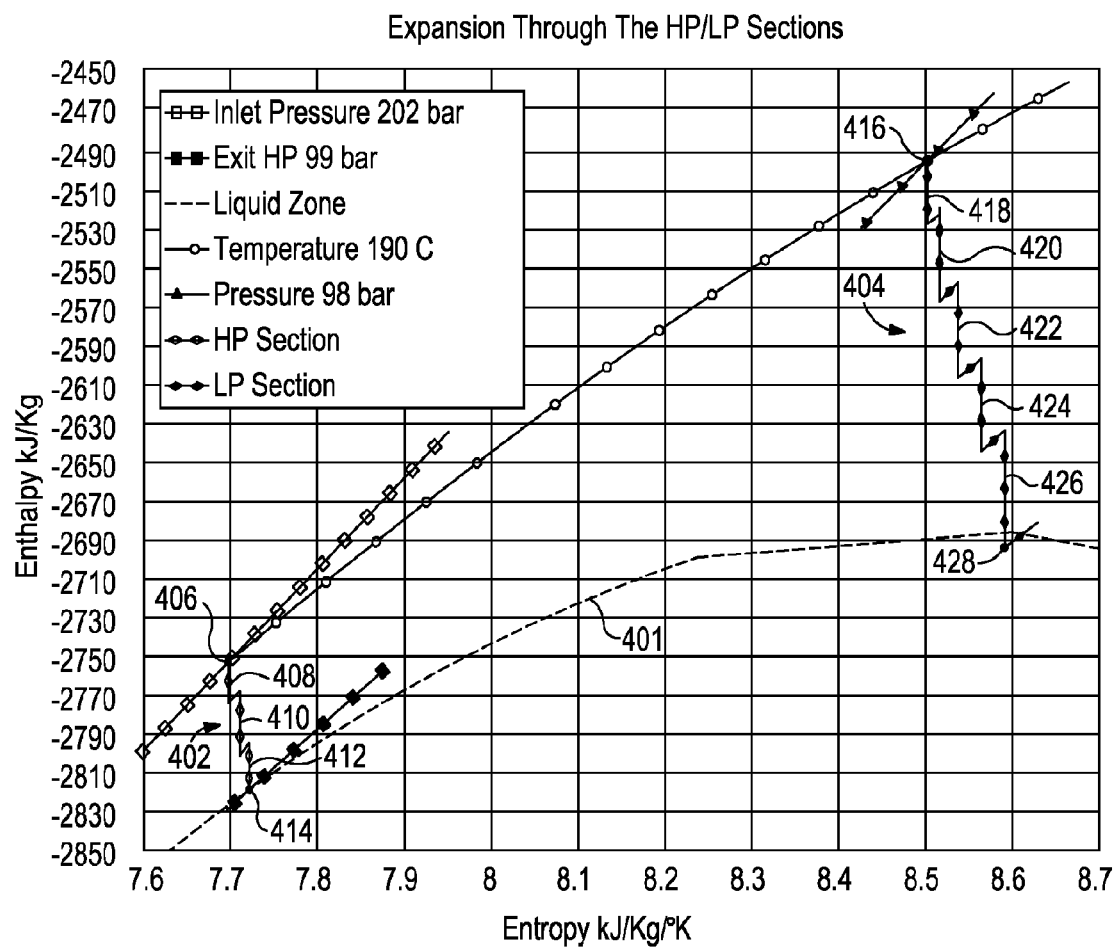
FIG. 4 illustrates an enthalpy versus entropy diagram generally depicting the expansion process of a working fluid, according to one or more embodiments disclosed.

Referring now to FIG. 4, with continued reference to FIGS. 1 and 2, exemplary data derived from operating the expander-generator 100 using ammonia as the working fluid is shown. Specifically, FIG. 4 illustrates an enthalpy versus entropy diagram that generally depicts the expansion process of the ammonia working fluid as it courses through the expander-generator 100 generally described herein. The data line 402 represents the expansion of the ammonia in the high pressure expansion section 102 (FIG. 1), and the data line 404 represents the further expansion of the ammonia in the low pressure expansion section 104. It will be appreciated that the data reported and shown in FIG. 4 is merely by way of example and should not be taken as universal data for all types of working fluids.

A saturated liquid line 401 is also depicted in FIG. 4 and corresponds to the saturated liquid states of the particular working fluid, in this case ammonia. Working fluid existing above the saturated liquid line 401 exists substantially as a gas, and working fluid existing below the saturated liquid line 401 exists substantially as a liquid. Embodiments contemplated herein include maintaining the working fluid above the saturated liquid line 401 throughout the expansion process of the working fluid. As will be appreciated, maintaining the working fluid in gaseous form may increase the efficiency of the expander-generator 100 and minimize corrosive or erosive effects that liquids often have on rotating and stationary airfoils.

As shown in FIG. 4, the ammonia working fluid may be introduced into the high pressure expansion section 102 via the high pressure inlet 210 (FIGS. 1 and 2) at a temperature of about 190° C. or otherwise a temperature ranging from about 180° C. to about 210° C., as shown at point 406. The ammonia is further introduced at a pressure of about 202 bar or otherwise a pressure ranging from about 190 bar to about 210 bar, as also represented at point 406. As the ammonia expands across the high pressure radial expander 202, its enthalpy decreases while its entropy remains constant, as shown at point 408. A similar effect is assumed by the ammonia as it expands across each high pressure expander stage 204*a,b*, respectively represented at points 410 and 412. The working fluid exits the high pressure expansion section 102, 402 having a pressure of about 99 bar, as shown at point 414.

The embodiment depicted in FIG. 4 employs a heat exchanger 214, as generally described above with reference to FIG. 2. The heat exchanger 214 reheats the working fluid to a temperature of about 190° C. or a temperature ranging from about 180° C. to about 210° C., thereby increasing both its enthalpy and entropy, as generally shown at point 416. The pressure of the ammonia remains relatively unchanged and may be about 98 bar, as also represented at point 416. As the ammonia expands across the low pressure radial expander 206, its enthalpy decreases while its entropy remains constant, as shown at point 418. A similar effect is assumed by the ammonia as it expands across each high pressure expander stage 208*a-d*, respectively represented at points 420, 422, 424, and 426. The working fluid exits the low pressure expansion section 104, 404 having a pressure of about 21 bar, as shown at point 428.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An expander-generator, comprising:
   a hermetically-sealed housing having a rotatable shaft disposed therein, the rotatable shaft having a free end and extending from a first end of the hermetically-sealed housing to a second end of the hermetically-sealed housing;
   a high pressure expander section comprising a high pressure radial expander axially-offset from a series of high pressure axial expander stages, each high pressure axial expander stage comprising a plurality of stator vanes axially-spaced from a plurality of rotor blades radially mounted about the rotatable shaft, and the high pressure expander section being rotatably disposed on the rotatable shaft and configured to receive and expand a working fluid and discharge the working fluid via a high pressure discharge defined within the hermetically-sealed housing, thus imparting rotational motion to the rotatable shaft;
   a low pressure expander section rotatably disposed on the rotatable shaft and axially-offset from the high pressure expander section and in fluid communication with the high pressure expander section via the high pressure discharge, wherein the low pressure expander is configured to receive and further expand the working fluid derived from the high pressure discharge to impart additional rotational motion to the rotatable shaft; and
   a generator coupled to the free end of the rotatable shaft, wherein the working fluid is expanded to rotate the rotatable shaft and thereby generate rotational shaft power to be used by the generator to generate electricity.

2. The expander-generator of claim 1, wherein the high pressure expander section and the low pressure expander section are configured in a back-to-back arrangement along the rotatable shaft.

3. The expander-generator of claim 1, wherein the working fluid is ammonia.

4. The expander-generator of claim 1, wherein the working fluid remains in a gaseous state throughout expansion in both the high pressure expander section and the low pressure expander section.

5. The expander-generator of claim 1, wherein the low pressure expander section comprises a low pressure radial expander axially-offset from a series of low pressure axial expander stages.

6. The expander-generator of claim 5, wherein the low pressure radial expander is a radial expander wheel configured to receive the working fluid radially and discharge the working fluid axially.

7. The expander-generator of claim 1, further comprising a balance piston disposed on the rotatable shaft and interposed between the high pressure expander section and the low pressure expander section.

8. The expander-generator of claim 1, further comprising a heat exchanger fluidly coupled to the high pressure discharge and configured to increase a temperature of the working fluid before injecting the working fluid into the low pressure expander section.

9. The expander-generator of claim 1, further comprising a high pressure inlet defined in the hermetically-sealed housing to receive and swirl the working fluid before it enters the high pressure radial expander.

10. The expander-generator of claim 9, wherein the high pressure radial expander is a radial expander wheel configured to receive the working fluid radially and discharge the working fluid axially.

11. A method of expanding a fluid, comprising:
    introducing a working fluid into a high pressure expander section disposed within a hermetically-sealed housing, the hermetically-sealed housing having a rotatable shaft disposed therein and the high pressure expander section comprising a high pressure radial expander axially-offset from a series of high pressure axial expander stages, each high pressure axial expander stage comprising a plurality of stator vanes axially-spaced from a plurality of rotor blades radially mounted about the rotatable shaft;
    expanding the working fluid in the high pressure radial expander of the high pressure expander section, thereby providing rotation to the rotatable shaft;
    expanding the working fluid in the high pressure axial expander stages of the high pressure expander section, thereby providing additional rotation to the rotatable shaft;
    discharging the working fluid from the high pressure expander section and introducing the working fluid into a low pressure expander section axially-offset from the high pressure expander section; and
    expanding the working fluid in the low pressure expander section thereby providing additional rotation to the rotatable shaft, wherein rotation of the rotatable shaft generates rotational power for a generator coupled to a free end of the rotatable shaft.

12. The method of claim 11, further comprising increasing the temperature of the working fluid discharged from the high pressure expander section prior to introducing the working fluid into the low pressure expander section.

13. The method of claim 11, further comprising maintaining the working fluid in a gaseous state throughout expansion in both the high pressure expander section and the low pressure expander section.

14. The method of claim 11, further comprising disposing the high pressure expander section and the low pressure expander section in a back-to-back and axially-offset configuration.

15. The method of claim 11, wherein introducing the working fluid into the high pressure expander section further comprises:

introducing the working fluid into a high pressure inlet defined in the hermetically-sealed housing;
swirling the working fluid with the high pressure inlet; and
introducing the working fluid radially into the high pressure radial expander.

16. The method of claim 11, wherein introducing the working fluid into the low pressure expander section further comprises:
introducing the working fluid into a low pressure inlet defined in the hermetically-sealed housing; and
introducing the working fluid radially into a low pressure radial expander.

* * * * *